UNITED STATES PATENT OFFICE.

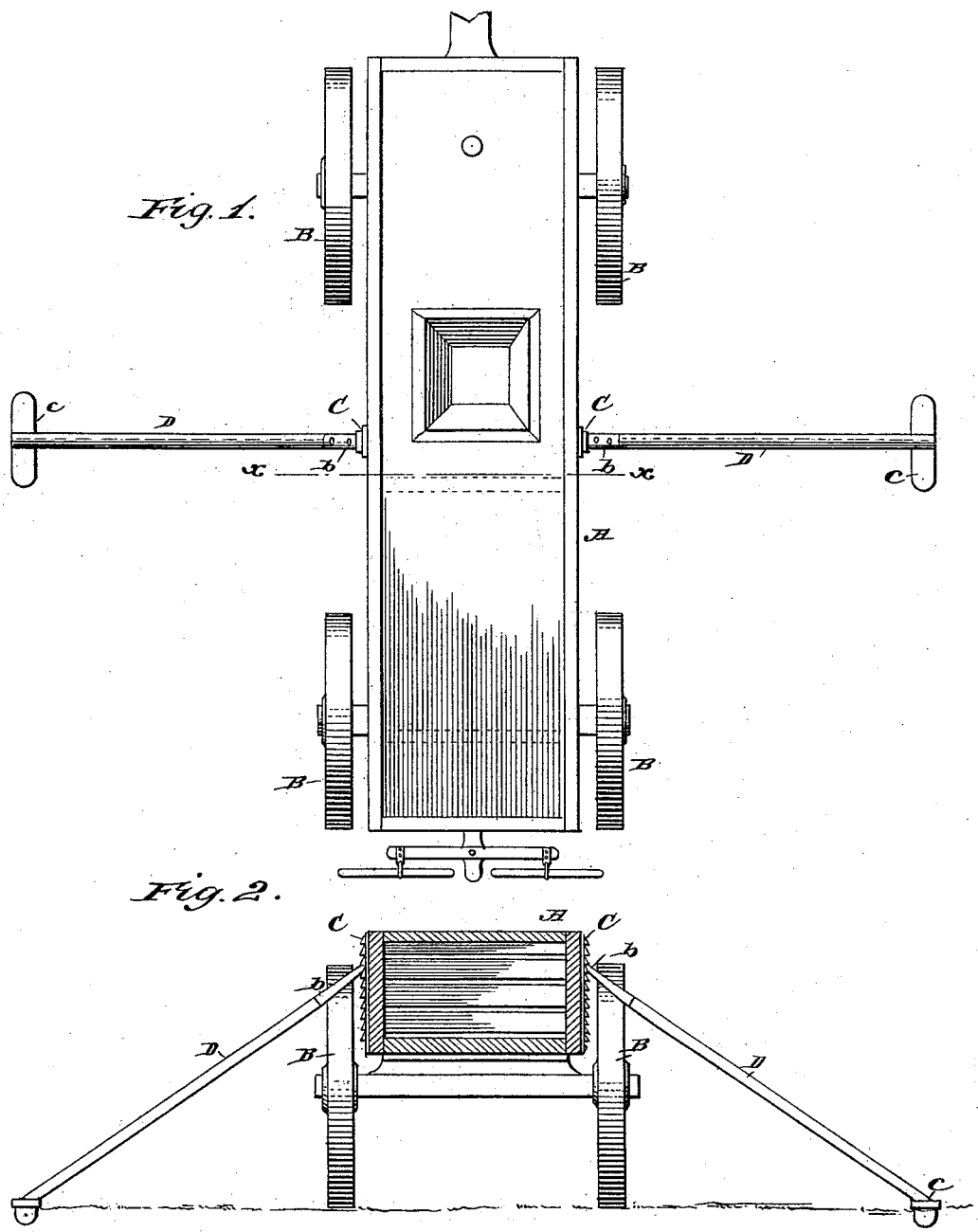

MILLS McCULLA, OF MILFORD, IOWA.

ANCHOR FOR PORTABLE HAY-PRESSES.

SPECIFICATION forming part of Letters Patent No. 408,924, dated August 13, 1889.

Application filed October 29, 1888. Serial No. 289,364. (No model.)

*To all whom it may concern:*

Be it known that I, MILLS MCCULLA, of Milford, in the county of Dickinson and State of Iowa, have invented a new and useful Improvement in Anchors for Portable Hay-Presses and other Machines or Powers, of which the following is a full, clear, and exact description.

This invention relates to braces or means for anchoring and holding firm portable hay-presses and other machines operated by horse-power generally through the intervention of a lever to which the horse is hitched. While push-braces of a totally different character to mine have been used, ordinarily these powers or machines have been staked down to the ground by wooden or iron stakes, to hold them solid as the horse pulls upon them on opposite sides alternately.

My invention consists in a power-anchor of novel construction for the purpose above named, substantially as hereinafter described, and pointed out in the claim, and whereby not only stakes are dispensed with, but the anchoring, in a measure, is effected automatically, and the means used are of the simplest possible description.

Reference is to be had to the accompanying drawings, forming a part of this specification, in which similar letters of reference indicate corresponding parts in both the figures.

Figure 1 represents a plan view of the box-frame of a portable hay-press mounted on wheels and designed to be operated by horse-power, in the usual or any suitable manner, and having my improved anchoring means applied; and Fig. 2 is a vertical transverse section of the same upon the line $x\ x$ of Fig. 1.

A indicates the body or box-frame of a hay-press, of rectangular form, of greater length than width, and mounted on carrying-wheels B, for the purpose of transportation. Said box-frame is intended to represent a mounted horse-power frame, for the purpose of showing how my improved anchor is applied to the power.

Secured to either or opposite sides of the body or frame A is a plate C, having ratchet-teeth, one above the other, across its face. There may be any number of these ratchet-plates—that is, one or more; but generally one on each side of the frame of the machine is preferred, as here shown, and will suffice.

To prevent the machine or power from shifting or moving sidewise when at work, by the pull of the horse first on one side of the machine and then on the other, and to hold the machine solid or firm, braces D, which may be made of wood tipped with iron, as at $b$, or which may be of any other suitable material, are allowed to engage at their upper or tipped ends with certain of the upper teeth on said plates, and are arranged to project angularly from the sides of the machine down to the ground. The lower ends of said braces are fitted with a ground-rest or foot $c$, of any suitable construction that will give a good bearing to said braces and prevent them from pushing deeply into the ground. When the power thus stayed or anchored on its opposite sides is set to work, the horse in pulling, through the lever to which it is hitched, on one side of the machine, and exerting a tendency to tilt the machine to that side, will cause the brace D on the opposite side of the machine to drop into engagement with certain of the teeth of the plate C on the opposite side of the machine, and as the pull of the horse is afterward transferred to the other side of the machine, then the other brace D, on the reverse side, will be dropped into engagement with others of the teeth in the plate C on its side, and this action may be repeated till both braces, in dropping, give a firm support to the machine and cause it to be absolutely solid, the braces automatically operating to take up what may be termed the "slack motion"—that is, the shifting movement of the frame as produced by the pull of the horse on different sides.

Having thus described my invention, what I claim as new, and desire to secure by Letters Patent, is—

The combination, with a hay-press or other machine, of the ratchet-plates C, secured to the sides of the frame of the press or machine, and the braces D, each provided with a foot c, for securing it to the ground, and with point b, for engaging the ratchet-plate, substantially as described, whereby the shifting movement of the frame produced by the draft on different sides will cause the points of the braces to alternately drop into engagement with the teeth of the plate, and thereby automatically take up the slack motion or shifting movement of the machine, as set forth.

MILLS McCULLA.

Witnesses:
GEORGE CHASE,
E. E. HALL.